Figure 1:
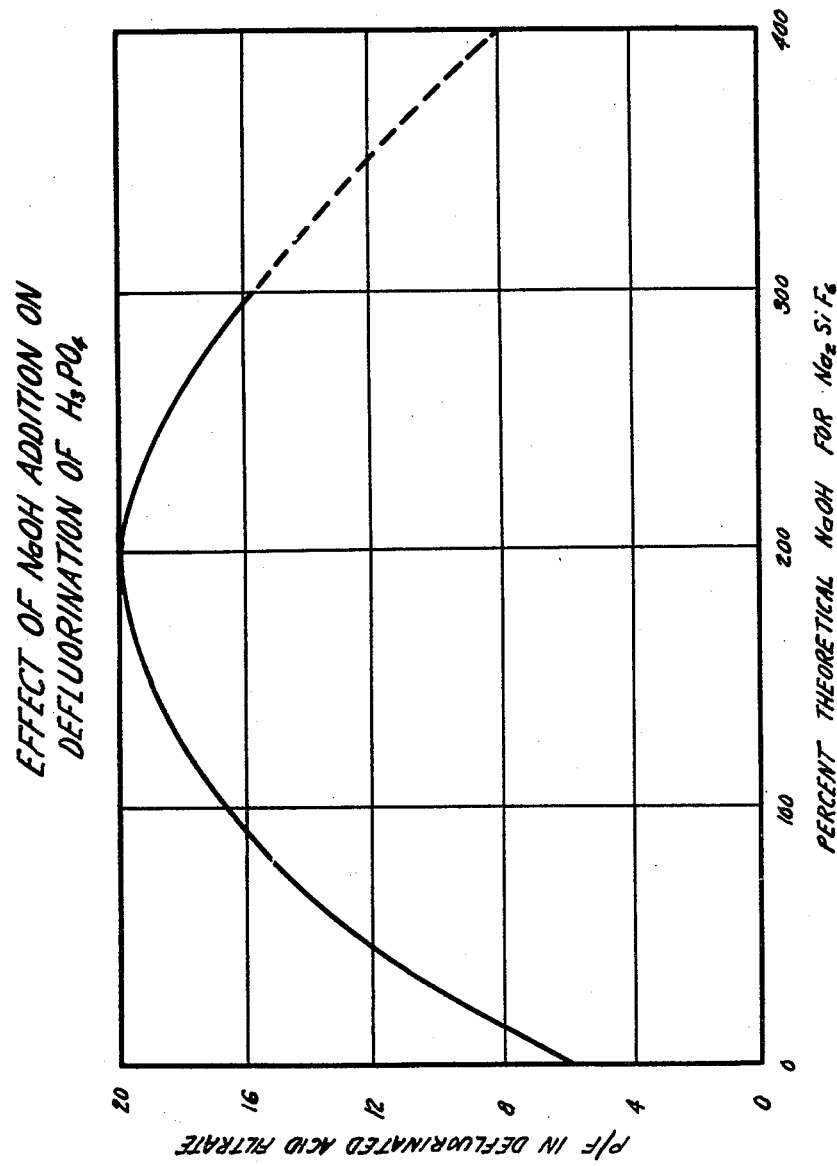

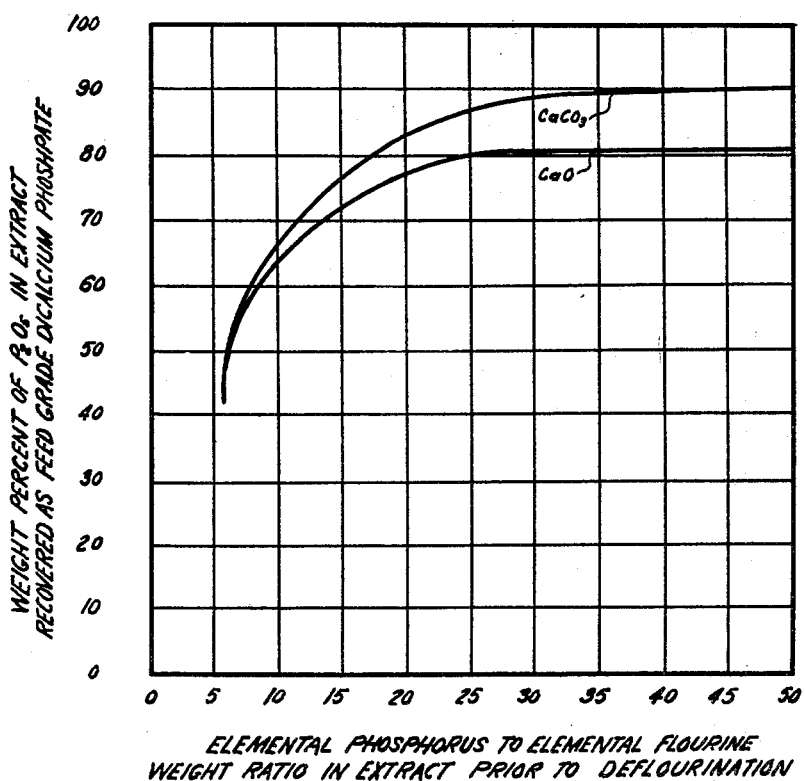
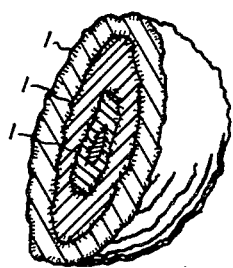
Fig. 2
Fig. 3

United States Patent Office 3,178,278
Patented Apr. 13, 1965

3,178,278
PROCESS FOR PRODUCING A MULTILAYER HIGH ANALYSIS, GRANULAR, NON-HYGROSCOPIC PHOSPHATE FERTILIZER AND THE PRODUCT THEREOF
Paul D. V. Manning, Pasadena, Calif., and Ira M. Le Baron, Evanston, Ill., assignors to International Mineral & Chemical Corporation, a corporation of New York
Original application May 27, 1955, Ser. No. 511,624, now Patent No. 2,976,119, dated Mar. 21, 1961. Divided and this application Aug. 20, 1959, Ser. No. 835,081
5 Claims. (Cl. 71—34)

This application is a division of Manning and Le Baron application Serial No. 511,624, now Patent No. 2,976,119, filed May 27, 1955, which is a continuation-in-part of Manning and Le Baron application Serial No. 151,728, now abandoned, the disclosure of which is incorporated herein by reference. Related inventions are disclosed in Le Baron applications Serial Nos. 186,850 and 311,950, now Patent Nos. 2,709,649, May 31, 1955, and 2,761,775, Sept. 4, 1956, respectively.

This invention relates generally to the production of various phosphatic materials from phosphate rock. More particularly, the invention relates to the production from phosphate rock of feed grade dicalcium phosphate and a high analysis phosphate fertilizer product.

There has developed in recent years a substantial market for dicalcium phosphate of a grade and quality useful as an animal feed supplement. In such feed grade dicalcium phosphate, the weight ratio of phosphorus calculated as elemental phosphorus to fluorine calculated as elemental fluorine must be not less than about 100, and preferably not less than about 200. Inasmuch as phosphate rock contains in the natural state significant amounts of fluorine, the production of feed grade dicalcium phosphate from phosphate rock has presented a particularly difficult problem. This invention, accordingly, embraces a process for the manufacture of feed grade dicalcium phosphate from phosphate rock, which process is particularly advantageous in that it may be integrated on a commercial scale with the production of a high analysis phosphate fertilizer.

Since a substantial portion of the cost of fertilizer must defray transportation expenses, it is frequently economically unsound for the farmer to purchase low analysis fertilizers. Fertilizer manufacturers, therefor, generally concurrently with the development of the feed grade dicalcium market have been required to produce increasingly large percentages of high analysis phosphate fertilizer products. The conventional high analysis phosphate fertilizer product of the prior art is triple superphosphate in which substantially the entire phosphorus pentoxide content is water-soluble monocalcium phosphate. The addition of such material to the soil at the time of planting gives rise to the condition wherein the young plants have available, for immediate use, large quantities of phosphorus pentoxide, while the same plants at their later stages of development have available less phosphorus pentoxide because of the leaching of such values from the soil by rain and irrigation waters. Studies by Nelson et al., Soil Science Society Proceedings, vol 12, pages 113–118 (1948), using superphosphate containing radioactive phosphorus show that in the case of many fertilized crops, particularly corn, the phosphate is required in largest degree by the plant as it approaches maturity, and to a lesser degree while the plant is in the seedling stage. These studies have also shown that plants approaching maturity have been forced to pirate phosphorus values from the permanent soil structure because of the absence of phosphorus derived from the applied fertilizer occasioned, at least in part, by previous leaching of phosphorus values from the applied fertilizer while these same plants were undergoing their initial growth periods. Thus, the application of water-soluble phosphate values to the soil at the time of planting results in large quantities of phophorus being present at a time when these large quantities are not needed, and fewer of such values from the fertilizer being present at a subsequent date when large amounts are needed. This invention accordingly is in part concerned with the production from phosphate rock of novel, high analysis phosphate fertilizers which contain a substantial portion of available water-insoluble phosphate values and which, therefore, are effective to supply fertilizing values to plants throughout the normal growing season. The high analysis phosphate fertilizer products which the invention embraces can be ammoniated or otherwise modified to provide a more complete high analysis fertilizer.

It is accordingly a primary object of the invention to provide a method for the production from phosphate rock of feed grade dicalcium phosphate.

It is more particularly an object of the invention to provide a process for the calcium defluorination of aqueous solutions of fluorine-containing phosphatic materials pursuant to which the extent of loss of phosphate values to the defluorination procedure is minimized.

It is an additional object of the invention to provide a method for controlling and minimizing a percentage of the phosphate values present in the phosphate rock treated which are converted into phosphatic fertilizer and to thereby insure a maximum yield of the more valuable dicalcium phosphate.

It is an additional primary object of the invention to provide a method for the production from phosphate rock of a high analysis phosphate fertilizer.

It is a further object of the invention to provide a high analysis phosphate fertilizer product effective to provide phosphate values to plants throughout a normal annual growing season.

It is a specific object of the invention to provide a method for the production of a novel, multilayered, pelletized phosphate fertilizer product.

It is a more specific object of the invention to provide an integrated commercial process for the concurrent production of a novel high analysis phosphate fertilizer and of feed grade dicalcium phosphate.

The invention generally finds utility in conjunction with processes which entail acidulation of phosphate rock, extraction of the solubilized phosphate values of the acidulated rock with an aqueous medium, and processing the phosphate rich extract so obtained to produce a high analysis fertilizer or a feed grade dicalcium phosphate, or both. A representative process of the general type is described in copending Le Baron application Serial No. 312,519, now Patent S.N. 2,722,472, entitled "Process for Producing Phosphate Materials," the disclosure of which is incorporated herein by reference.

In such a process, sulfuric acid is a major item of expense and is substantially entirely converted to calcium sulfate, a worthless byproduct which is discarded. The invention accordingly envisions in one embodiment the use of an amount of sulfuric acid substantially less than that required to convert entirely to phosphoric acid the phosphate values of the processed phosphate rock.

Theoretically, the phosphate values of phosphate rock can be water-solubilized by reaction of the rock with an amount of sulfuric acid requisite only to convert such phosphate values to monocalcium phosphate. The production of ordinary superphosphate entails such a procedure in which the sulfuric acid may be employed in some cases in an amount up to about 10% in excess of that required to convert to monocalcium phosphate the phosphate values of the rock. Unfortunately, ordinary superphosphate manufacturing processes yield a product in which the calcium sulfate is present in a form exceedingly difficult to separate from an aqueous slurry of such product, such as that formed in an attempt to extract the monocalcium phosphate values thereof with water.

The present invention accordingly contemplates, in the embodiment here under consideration, acidulating of particulate phosphate rock with sulfuric acid in an amount requisite to convert the phosphate values of the rock primarily to monocalcium phosphate, agitating or slurrying the acidulated rock with an aqueous medium, and filtering of the slurry so produced, the entire procedure being carried out under conditions and in a manner effective to produce calcium sulfate and other water-insoluble materials in a form more easily and readily separated from the liquid phase of the acidulated rock slurry.

Pursuant to this facet of the invention, particulate phosphate rock of a particle size such that at least about 50% by weight, preferably about 50% to about 85% by weight thereof, will pass through a 200 mesh screen is reacted with 60% to 70%, preferably 65% to 70%, aqueous sulfuric acid in an amount equal to from about 112% to about 117% of that required to form monocalcium phosphate from the phosphatic materials contained in the rock and to react with the impurities present therein. The acidulated rock is then slurried or otherwise contacted, either before or after curing, with an aqueous medium to extract the monocalcium phosphate and other water-soluble phosphate values, and the slurry is processed to separate undissolved solids, primarily calcium sulfate, in conventional manner. It has been found that by following these conditions, there is obtained a readily filterable slurry from which the calcium sulfate and other acid-insoluble and water-insoluble impurities may be readily and expeditiously removed.

Furthermore, the acidulated rock mix is produced in a form and condition which can be readily processed and transported on a commercial basis which is not the case when the upper limit of acidulation of about 117% is substantially exceeded unless, of course, a sufficient amount of sulfuric acid is employed to convert all of the phosphate values in the rock substantially to orthophosphoric acid.

The following examples illustrated this feature of the invention:

Example I 100 grams of particulate phosphate rock ground to a size such that about 50% to 60% thereof would pass a 200 mesh screen acidulated with about 65% aqueous sulfuric acid in an amount equal to 110% of that requisite to convert all of the phosphate values present in the rock to monocalcium phosphate and to react with the impurities present therein. The acidulated rock so produced was cured for about one-half hour and then slurried with water employed in an amount equal to 1.1 grams of water for each gram of acidulated rock. The slurry so produced was heated to 60° C. and filtered through a 11 cm. Buckner filter. The filtration rate was 13.6 gallons per hour per square foot.

Example II

Example I was repeated with the exception that sulfuric acid was employed in an amount equal to 115% of that requisite to convert all of the phosphate values in the rock to monocalcium phosphate and to react with the impurities present. The acidulated rock mix was slurried and filtered in the same manner as described in Example I. The filtration rate was 17.7 gallons per hour per square foot.

In the practice of this feature of the invention, at least during the time the ground phosphate rock and sulfuric acid are admixed, intensive and thorough agitation of the admixture is necessary. Although it is physically possible to agitate this freshly prepared admixture for a considerable period of time, maximum recovery of phosphorus values in their water-soluble forms is attainable when the period of agitation is kept as short as possible; provided, however, that the mixing is sufficiently long and intense to afford intimate and uniform distribution of sulfuric acid throughout the phosphate rock mass, and further provided the acidified rock is subsequently stored.

In a preferred embodiment of this feature of the invention, the slurry, once having been thoroughly mixed for a short time, generally not more than a few minutes, is passed onto a continuous and moving belt on which it is allowed to remain for a period of time, generally about 20 to 30 minutes, sufficient to permit the soupy material to partially harden or set. The speed of the belt is such as to give a depth of material sufficient to obtain a resultant set of the desired bulk density and to allow the required amount of time for the mix to only partially harden or set, such that it is not soupy when discharged from the belt. Upon discharge from the belt, the material, having attained its initial set, is transferred to a storage pile. If it is deposited or piled prior to having reached its initial set stage, it is often difficult to remove later from the pile, so much so at times, that explosives may be required to break it up. When handled as above described, however, it is easily removed from the pile after storage for from five to fifteen days by means of mechanical shovels or scoops, or manually. At all times during storage, and at the time of removal from storage, the material is porous and friable. The material remains in the storage pile to allow the reactions to approach equilibrium and to bring the water-soluble phosphorus pentoxide in the material up to the maximum within practical limits. Generally, a two-week storage time will result in a material containing between about 94% and about 97% water-soluble phosphorus pentoxide, which is desirable at this point in the process in view of subsequent process steps. The stored material is then easily pulped or slurried with an aqueous medium, since it is not set into a hard mass or lumps which require disintegration by application of explosives or use of hammermills, etc. Sufficient aqueous medium, which may be water or previously produced extract or leach solution, is appropriately added so that the initial resulting slurry contains between about 35% to about 45% of undissolved solids although more concentrated or more dilute slurries can be formed. Agitation of the mixture of aqueous medium and acidulated phosphate rock results in an ultimate slurry containing a liquid phase in the form of a solution containing between about 20% and 33% to 35% by weight of dissolved solids and about 67% to about 80% by weight of water. The solid phase of the slurry takes the form of undissolved solids which are discarded, which solids contain only about 2.5% of the total phosphorus pentoxide values which were originally present in the rock and which consist primarily of calcium sulfate. The liquid phase of the slurry, after separation from the undissolved solid phase, comprises essentially an aqueous solution of monocalcium phosphate and a small amount of phosphoric acid.

Separation of the solids from the extract solution so obtained may be carried out in any convenient and conventional manner such as, for example, by filtration, countercurrent multistage decantation, preferably at about 50–60° C., by centrifuging or by use of liquid phase cyclone separators. Increasing the temperature increases the rate of settling or separation and, therefore, increases the capacity of the settling or separation device. However, if material is held above 60° C. for any considerable length of time, some of the water-soluble phosphorus pentoxide precipitates as insoluble dicalcium phosphate.

Aqueous solutions of phosphatic materials so produced are free of calcium sulfate and like materials, other than water, and have little or no value as animal feed supplements or fertilizers.

A threshold problem incident to the production of feed grade dicalcium phosphates from such extracts centers around the reduction of the fluorine content thereof to a degree requisite to the production of feed grade dicalcium phosphate which has an elemental phosphorus to elemental fluorine weight ratio of not less than about 100, preferably not less than about 200. That aspect of this invention which relates to the production from acidulated phosphate rock of a substantially calcium sulfate free extract has particular relevance to feed grade dicalcium phosphate. Efforts to defluorinate extracts of acidulated phosphate rock in the presence of acid-insoluble materials, including calcium sulfate, are commercially infeasible and result in excessive loss of phosphorus pentoxide values in the calcium sulfate waste product. Accordingly, it is important to remove substantially all of the calcium sulfate from the acidulated rock extract prior to the defluorination thereof.

The prior art has suggested e.g., defluorination of solutions of fluorine-containing phosphates, such as acidulated phosphate rock extracts, by addition thereto inter alia, of alkali metal ions, preferably in the form of solutions of alkali metal salts, such as sodium and potassium chlorides and the like. Such alkali metal defluorination processes are ineffective to produce a defluorinated or solution from which a dicalcium phosphate product of animal feed grade can be produced. The addition of alkali metal ions to such solutions is effective only to increase the elemental phosphorus to elemental fluorine weight ratio to a figure substantially below 100, normally less than about 50. The addition of excessive amounts of such ions results in a decrease in the phosphorus to fluorine elemental weight ratio in the extract due to the fact that more soluble forms of alkali metal fluoride-containing compounds are produced.

Reference is made to FIGURE 1 which demonstrates that the addition of sodium hydroxide to wet process 26% orthophosphoric acid obtained by the acidulation of phosphate rock with sulfuric acid in an amount sufficient to convert substantially all of the phosphorus values to orthophosphoric acid, followed by the extraction of the acidulated rock with water and the removal of calcium sulfate, all in conventional manner, does not achieve substantial defluorination of such acid. It will be observed that the sodium ions so introduced are effective to raise the elemental phosphorus to elemental fluorine weight ratio of the acid only to about 20, which figure is reached after sodium ions have been added in an amount equal to about 200% of that requisite to form sodium silicofluoride with the fluorine present in the acid. It will be observed that as additional amounts of sodium ions are added, the elemental phosphorus to elemental fluorine weight ratio again decreases to less than 15. If excessive amounts of sodium ions are added, for example, in an amount requisite to convert the phosphate present in the system from phosphoric acid to monosodium phosphate, the elemental phosphorus to elemental fluorine weight ratio of the resulting system will be substantially lower than required for satisfactory calcium defluorination.

Calcium ion supplying compounds, such as inorganic oxygen-containing basic calcium compounds, including calcium oxide, calcium hydroxide, and calcium carbonate, can be employed to effect the requisite defluorination of aqueous solutions of fluorine-containing phosphatic materials. Such calcium bases react with fluorine and other impurities present, including aluminum and iron, to form fluorine-rich precipitates which can be separated as by filtration, decantation, or the like, from the defluorinated liquor in which the precipitate is formed.

Effective calcium defluorination of aqueous solutions of fluorine-containing phosphatic materials through utilization solely of calcium bases results in the concurrent precipitation and loss of excessive amounts of phosphorus values to a fluorine-rich precipitate which is formed. Accordingly, one feature of this invention is addressed to a process for minimizing the loss of phosphorus pentoxide values to the fluorine-rich precipitate formed when calcium bases or other forms of calcium ions, such as those derived from calcium oxide, calcium hydroxide, and calcium carbonate and the like, are employed to defluorinate aqueous solutions of fluorine-containing phosphatic materials, and particularly extracts or such solutions derived from acidulated phosphate rock.

The quantity of phosphorus pentoxide lost to the fluorine-rich precipitate formed in the calcium defluorination of aqueous extracts, such as those obtained from acidulated phosphate rock, to produce a defluorinated extract having a predetermined minimum fluorine content has, to various workers in the art, heretofore been considered to be substantially independent of the initial fluorine content of the extract processed. It has now been discovered that the calcium defluorination of aqueous solutions of fluorine-containing phosphatic materials is attended by many of the characteristics of systems in which the solid phase or phases are not definite chemical compounds. It can be theorized that such calcium defluorination procedures result in the formation of fluorine-containing solids crystallized with calcium phosphates in a form analogous to solid solutions of varying composition. The foregoing theory is offered in the interest of completeness and is not limiting of or definitive of this aspect of the invention.

In any event, in accordance with this feature of the invention, it has been discovered that the loss of phosphate values to the defluorination precipitate in the calcium defluorination of aqueous solutions of fluorine-containing phosphatic materials can be minimized by controlling or adjusting the elemental phosphorus to elemental fluorine weight ratio of the solution to be defluorinated to a value of not less than about 15, and preferably to a value within the range of from about 25 to about 50, prior to the calcium defluorination step. In general, two basic methods are available for the adjustment or control of the elemental phosphorus to elemental fluorine weight ratio in the acidulated rock extracts or other aqueous solutions of fluorine-rich-containing materials which are to be defluorinated pursuant to the invention.

Pursuant to the first mode of such control, a substantial amount of fluorine may be removed from the acidulated rock prior to extraction thereof with an aqueous medium whereby an extract of controlled fluorine content is obtained in the first instance. For example, the elemental phosphorus to elemental fluorine weight ratio of an acidulated phosphate rock extract may be controlled to the desired value of not less than about 15 by curing or aging the acidulated rock mix under atmospheric conditions for a period of at least several days, normally at least about 5 days, and preferably at least about 14 days or longer, prior to extraction thereof with an aqueous medium. It has been discovered that a sufficient amount of fluorine is eliminated from the acidulated rock during such aging period to produce an ultimate extract having a phosphorus to fluorine weight ratio of not less than about 15. It will be appreciated that expedients can be availed of, for example, to shorten the aging time, such expedients taking the form of heating the acidulated rock mixture, or other methods known to the art to expedite chemical reactions.

Alternatively, there may be produced an extract from freshly acidulated rock, which extract may be thereafter partially defluorinated by means other than calcium ions prior to the calcium defluorination procedure. For example, alkali metal ions, such as those derived from alkali metal hydroxides, chlorides, sulfates, or the like, including sodium, potassium, and lithium chlorides, bromides, sulfates, hydroxides, and the like, can be employed to increase the elemental phosphorus to elemental fluorine ratio of such extracts to a figure requisite to the feasible calcium defluorination thereof. Accordingly, an aqueous extract of acidulated phosphate rock can be initially partially defluorinated by the treatment thereof with the requisite amount of an alkali metal ion, such as an alkali metal hydroxide or halide, to produce a partially defluorinated solution having an elemental phosphorus to elemental fluorine weight ratio of not less than about 15. The defluorination can thereafter be completed by treatment of the partially defluorinated extract with an appropriate amount of a calcium base material, such as calcium carbonate, calcium oxide, or calcium hydroxide, to produce an ultimate defluorinated extract in which the elemental phosphorus to elemental fluorine weight ratio is at least about 100.

The particular degree of acidulation of the rock from which the aqueous extracts of fluorine-containing phosphatic materials are derived is not a critical feature of this aspect of the invention. Phosphate rock can be acidulated to any desired degree with any desired mineral acid, such as sulfuric acid, phosphoric acid, hydrochloric acid, or nitric acid, effective to convert the phosphate values in the rock to water-soluble form. It is contemplated, of course, that the acidulating acid will be employed in an amount sufficient to convert the predominant amount of the phosphate values present in the rock to water-soluble phosphate compounds, such as monocalcium phosphate or phosphoric acid, or mixtures thereof. The acidulation process described in the preceding portions hereof can appropriately be employed to produce suitable monocalcium phosphate solutions.

The use broadly of calcium ions to defluorinate aqueous solutions of fluorine-containing phosphatic materials is known to the art. Such prior art procedures can be employed in the calcium defluorination step of this feature of the invention. In general, such procedures entail the addition of inorganic calcium bases, such as calcium oxide, calcium hydroxide, or calcium carbonate, preferably in the form of a slurry, to the solution of phosphatic material to be defluorinated. Reference is made to Le Baron application Serial No. 424,712, now Patent Serial No. 2,889,200, entitled "Method of Preparing Defluorinated Material," which describes a preferred method for the calcium defluorination of aqueous extracts of acidulated phosphate rock. In accordance with the teachings of that application, such extracts are first adjusted to a phosphorus pentoxide concentration in the range of about 11% to about 20% by weight and then reacted with calcium carbonate in an amount sufficient to produce a pH in the resulting reaction mixture between about 2.3 and 3.0, the reaction time being generally from about 30 to about 120 minutes. This invention, of course, is not restricted to the specific defluorination procedure disclosed in the aforementioned Le Baron application but is embracive of calcium deflourination operations generically of aqueous solutions of fluorine-containing phosphatic materials in which the elemental phosphorus to elemental fluorine weight ratio is controlled, as contemplated by the invention prior to the calcium defluorination step.

Reference is made to FIGURE 2 which shows the percentage of phosphate values retained in the defluorinated extract in the calcium defluorination of an aqueous extract of acidulated rock with both calcium oxide and calcium carbonate as a function of the elemental phosphorus to elemental fluorine weight ratios in the treated extracts. The data represented in the figure are those resulting from the calcium defluorination of the extracts in question to produce in the defluorinated extracts an elemental phosphorus to elemental fluorine weight ratio of 200. The extract solutions employed were wet process phosphoric acid produced by the sulfuric acidulation of phosphate rock followed by agitation of the acidulated rock with water and removal of calcium sulfate from the slurry so formed, all in conventional manner well known to the art, as described, for example, in the book "Phosphoric Acid, etc.," by Waggaman, Chapter 12, 2nd edition. The calcium oxide and calcium carbonate were added in the form of an aqueous slurry. The extract which was defluorinated was adjusted to a phosphorus pentoxide content of about 18% by weight and the calcium bases were added in an amount sufficient to produce a pH in the reaction mixture between about 2.3 and 3.0. The contact time between the calcium bases and the extract to be defluorinated was on the order of about 30 to 40 minutes. It will be apparent from an examination of FIGURE 2 that the quantity of dicalcium phosphate retained in the defluorinated extract increases substantially as the ratio of elemental phosphorus to elemental fluorine in the extract to be defluorinated is increased. By reference to the curve, it will be observed that the untreated wet process phosphoric acid was characterized by an elemental phosphorus to elemental fluorine weight ratio of about 6. Calcium defluorination of such untreated acid resulted in a loss of more than 55% of the phosphorus pentoxide values to the fluorine-rich precipitate. Adjustment of the elemental phosphorus to elemental fluorine weight ratio in the extract prior to calcium defluorination to a value of at least 15 made it possible to retain in the defluorinated extract more than 70% of the phosphorus pentoxide values. The control of the elemental phosphorus to elemental fluorine weight ratio in the extracts employed to obtain the data graphically reflected in FIGURE 2 was effected by the addition of alkali metal ions to the extract prior to the calcium defluorination in the case of the higher elemental phosphorus to elemental fluorine weight ratio adjustments, and in some cases, by aging the acidulated rock from which the extract was obtained in the case of the lower of such ratios.

The invention further relates to the production from aqueous extracts of acidulated phosphate rock of high analysis phosphate fertilizers containing available phosphorus pentoxide in both water-soluble and water-insoluble form. As in the case of feed grade dicalcium phosphate, it is essential in the conversion of such extract solutions to high analysis phosphate fertilizers, that the waste product calcium sulfate be effectively and efficiently separated therefrom. It is preferred to produce such calcium sulfate free extracts by the procedure heretofore described wherein the phosphate values of phosphate rock are extracted primarily in the form of monocalcium phosphate. This facet of the invention, however, in at least some of its ramifications, extends to the production of high analysis fertilizers from alternative types of aqueous acidulated phosphate rock extracts, as well as from aqueous solutions or slurries of phosphate materials derived from sources other than phosphate rock.

Aqueous extracts of acidulated rock, including such extracts in which the phosphate values are present predominantly as monocalcium phosphate, do not yield a satisfactory commercial fertilizer product merely by dehydration. Commercially acceptable fertilizer products can be obtained, however, through addition to such extracts of calcium bases, such as calcium oxide, calcium carbonate, and calcium hydroxide, provided the extracts to which such bases are added are properly and effectively dehydrated to produce a granular or pellet type fertilizer.

It is generally preferred to employ such calcium bases in an amount requisite to provide in the resulting mixture a calcium oxide to phosphorus pentoxide mole ratio of at least about 0.85, and preferably at least about 1.0. The upper limit of calcium base addition is a function of the amount of water-insoluble phosphorus pentoxide desired in the form of dicalcium phosphate in the final product. An appropriate upper limit for the amount of calcium base material is in an amount requisite to provide in the resulting reaction mixture a calcium oxide to phosphorus pentoxide mole ratio of not more than about 1.2. A suitable range for such calcium base addition is an amount of calcium base requisite to produce in the extract to which the base is added a calcium oxide to phosphorous pentoxide mole ratio of from about 1.1 to about 1.4. Extracts to which calcium bases have been added in the amount indicated, if properly dried, yield a fertilizer product which is non-hygroscopic and which contains both water-soluble and water-insoluble forms of available phosphorus pentoxide, containing from about 45% to about 55% by weight of phosphorus pentoxide of which about 20% to about 40% is water-insoluble.

The proper dehydration of calcium base modified acidulated phosphate rock extracts entails a procedure whereby there is produced from such calcium treated extracts a high analysis fertilizer in the form of generally smooth-surfaced, porous pellets comprising a plurality of generally concentric layers of phosphate fertilizer material extending from the center of said pellets outwardly, said layers being of progressively increasing diameter. The mode of drying is such that there is produced in the final pelletized fertilizer product from about 5% to about 15% by weight of calcium pyrophosphate and from about 2% to about 10% by weight of calcium metaphosphate.

Reference is made to FIGURE 3 which shows schematically the structure of the pelletized fertilizer product of this invention. The schematic drawing represents a pellet of the fertilizer produce of this invention, one end of which has been removed as by cutting to show a cross section thereof. It will be observed that there are a plurality of generally concentric layers of fertilizer material extending from the center of the pellet outwardly. It may be expected that calcium pyrophosphate and calcium metaphosphate, which form a part of the fertilizer product of the invention, may be positioned or concentrated at the outer surfaces of the various layers, and particularly on the outer surface of the pellet when the pellets are prepared by drying the calcium base treated extracts in the desired manner, as hereinafter described.

In accordance with this aspect of the invention, there is provided a circulating bed of nuclei about which the pellets of fertilizer product are formed. Such nuclei preferably take the form of solid particles obtained by drying a calcium base treated aqueous extract of acidulated rock. Other pellet nuclei, such as particularly phosphate rock, sand, and the like, can be employed, particularly at the initiation of the pellet-forming process. Such circulating bed of pellet nuclei is repeatedly circulated under a spray of calcium base treated aqueous extract of acidulated rock and dried until there is produced a phosphate fertilizer in the form of a generally smooth-surfaced, porous, pellet comprising a plurality of generally concentric layers of fertilizer material extending from the center of said pellet outwardly and being of progressively increasing diameter. The drying of the pellets is carried out under conditions such that the temperature of the pellets does not at any time exceed a temperature of about 200° C., and the final moisture content is not in excess of about 5%, preferably from about 1% to about 5%.

In the preferred practice of the invention, the bed of pellet nuclei is circulated through a direct fired rotary drier, and calcium base treated acidulated phosphate rock extract is continuously sprayed on the recirculating load within the drier. The drier is maintained at a temperature of about 150° C. to about 250° C., and preferably about 175° C., with precautions being taken to insure that the temperature of the produce does not exceed about 200° C. and to produce a final product having a moisture content of not more than about 5%, preferably from about 1% to about 5%. It will be appreciated that instead of spraying the circulating load of solids with the calcium base treated extract inside the drier, such solids may be sprayed outside the drier and thereafter introduced into the drier as a wet feed.

In the preferred practice of this feature of the invention, approximately one part by weight of the calcium base treated aqueous extract of acidulated rock is added to each 4 to 10 parts by weight of recirculating solids, preferably the addition of calcium base treated extract to the solids is adjusted so that the mixture in the drier does not contain at any time more than about 15% by weight of moisture. The product discharged from the drier is screened for suitable mesh size, and is granular, non-dusting, and non-hygroscopic. The form of drier used does not constitute a critical feature of the invention; driers other than rotary driers can be employed.

An appropriate calcium base material for use in the production of high analysis phosphate fertilizers of the invention takes the form of the fluorine-rich precipitate which is obtained in the defluorination reaction previously described with reference to the production of dicalcium phosphate. Such a fluorine-rich precipitate can be appropriately reacted with an extract obtained from acidulated phosphate rock. Such extracts may be obtained from either cured or uncured acidulated phosphate rock. A particularly suitable extract is one obtained by acidulating phosphate rock in the manner previously described with an amount of sulfuric acid equal to from about 112% to about 117% of that required to convert the phosphate values present in the rock to monocalcium phosphate, and thereafter without any substantial storage time, leaching or otherwise extracting the solubilized phosphate values from the rock to produce a green or unaged extract. Normally such an extract can be prepared by processing the acidulated phosphate rock within a few minutes, normally within about 15 to about 90 minutes, after the acid and rock have been combined. The resulting extract is rich in phosphoric acid and may be expected to be characterized by a calcium oxide to phosphorus pentoxide mole ratio of from about 0.18 to about 0.30. Other types of aqueous extracts of acidulated phosphate rock can, of course, be employed.

The fluorine-rich precipitate produced incident to the production of dicalcium phosphate, as above described, can be reacted with such a green extract in an amount requisite to provide the desired calcium oxide to phosphorus pentoxide mole ratio in the ultimate fertilizer product. The reaction mixture or slurry so produced is formed into a pelletized fertilizer product in the same manner as previously described to produce a multi-layered, pelletized, high analysis phosphate fertilizer containing from about 45% to about 60% by weight of available phosphorus pentoxide. Such a product contains from about 30% to about 50% by weight of monocalcium phosphate, from about 5% to about 15% by weight of dicalcium phosphate, from about 0.5% to about 2% by weight of tricalcium phosphate, from about 2% to about 10% by weight of calcium metaphosphate, from about 5% to about 10% of calcium pyrophosphate, from about 3% to about 8% by weight of free phosphoric acid, and minor percentages of fluorine, aluminum, and iron containing materials aggregating not more than about 10% by weight of the fertilizer product.

The use of the fluorine-rich precipitate formed in the manufacture of dicalcium phosphate in the production of a high analysis phosphate fertilizer product is of particular significance in that embodiment of the invention which contemplates an integrated process for the simultaneous or concurrent production of high analysis fertilizers and feed grade dicalcium phosphate. Such a process is described in greater detail in the aforementioned copending Le Baron application Serial No. 312,519.

A specific embodiment of the invention, as addressed to the production from phosphate rock of a granular, non-hygroscopic, free-flowing fertilizer containing a high percentage of phosphorus pentoxide which is substantially completely available and which is present in both water-soluble and water-insoluble forms, entails (1) continuously mixing and agitating phosphate rock ground to a particle size such that about 50% to about 85% thereof will pass through a 200 mesh screen with 65% to 70% aqueous sulfuric acid, said sulfuric acid being employed in an amount equal to about 112% to about 117%, preferably about 115%, of that required to form monocalcium phosphate from the phosphatic materials contained in said rock and to react with the impurities contained in said rock, said mixture being agitated for not more than about 4 minutes, preferably not more than about 1 minute; (2) discharging the agitated mixture onto a continuously moving conveyor and maintaining said mixture on said conveyor for about 20 to 30 minutes to permit said mixture to initially set; thereafter discharging said mixture in initially set condition onto a curing pile and storing said mixture in said curing pile for several days, preferably about 5 to 15 days, to produce a cured phosphate material which is friable and porous and which, without prior mechanical disintegration, is easily slurried with an aqueous medium; (3) forming an initial aqueous slurry of said cured phosphate material containing about 35% to about 40% solids; (4) agitating said slurry for a short period of time to form a liquid phase containing about 20% to about 33% dissolved solids and about 67% to about 80% water; (5) heating said slurry to an elevated temperature not in excess of 60° C. and separating said liquid phase from the non-dissolved solids materials contained in said slurry and adding to said separated liquid phase a small amount of an inorganic calcium base, such as limestone; (6) thereafter introducing said liquid phase into a load, recirculating through a drier, of a particulate solid phosphate material resulting from the prior dehydration of similarly obtained liquid phase compositions, said liquid phase being added to said recirculating load in an amount such that the resulting combination does not contain more than about 15% of moisture, there being employed one part of said liquid phase for each 4 to 10 parts of solids in said load; (7) introducing said combination into said drier while said drier is operated at a temperature of about 150° C. to about 230° C. and maintaining said combination in said drier for a time period sufficient to effect reduction of the moisture content thereof to between about 1% and about 5% by weight and to produce at a temperature not in excess of 200° C. a granular, non-hygroscopic, free-flowing product containing about 55% to about 58% phosphorus pentoxide, of which about 20% to about 40%, preferably about 35%, by weight is water-insoluble, said available phosphorus pentoxide constituting substantially the entire amount of phosphorus pentoxide present in said product.

It will be appreciated that the acidulated phosphate rock may be simply discharged from the acidulating vessel into a cured or storage pile without necessarily being transported to such pile by means of a moving conveyor, although it is desirable to the end that a friable, cured product may be obtained, to permit the mixture to initially set and then disturb the initially set condition. Further, the specific embodiment of the invention, as described in detail above, may be practiced with an extract of freshly acidulated rock rather than an extract of cured rock.

In the practice of this invention for the production of a most desirable form of acidulated rock mixes, the rock is ground to a particle size such that substantially the entire amount of the rock will pass a 14 mesh screen with about 50% to about 80% by weight being of a particle size requisite to pass a 200 mesh screen.

The following examples are illustrative of the best modes presently known to the applicants for practicing the various features of the invention.

*Example III*

About 10 tons per hour of Florida phosphate rock was ground to a particle size approximately 52% of which passed through a 200 mesh standard screen. This rock analyzed about 67% bone phosphate of lime. The ground rock was mixed with about 6 tons per hour of about 98% sulfuric acid added as 51° to 54° Bé. aqueous solution. The mixture was thoroughly agitated for about two minutes after which it was discharged onto a continuous belt provided with exhaust means for gases such as sulfur dioxide, silicon tetrafluoride and the like, placed adjacent the point of discharge of slurry onto the belt. The belt length and its speed were such that the mixture remained on the belt about 20 minutes. The discharge from the belt was stored in a pile for about 14 days.

The stored material was then removed from storage, broken up and sufficient water added to give a slurry of about 35% undissolved solids. The slurry was subjected to four steps of continuous countercurrent decantation followed by a single filtration to produce a leach solution containing about 30% dissolved solids being of approximately 32° Bé. gravity. The discarded tailings contained about 2.5% of the 30% total phosphorus pentoxide, only about one-half of which is available. This extract was delivered to the storage tank 37, and had an elemental weight P/F of about 20.

A second acid mix was prepared utilizing the same proportions, but was not sent to storage. The green or unaged mix was delivered directly to the countercurrent decantation operation to produce a leach solution containing approximately the same percentage of dissolved solids as the extract from the aged superphosphate. This solution was delivered directly to storage tank 38. The extract from aged superphosphate was further processed by adding thereto approximately 6 parts by weight of limestone per 100 parts by weight of extract solution. It will be recognized that other materials capable of reacting in the same molecular proportions may be substituted for limestone, such as calcium oxide. The mixing of these proportions of ingredients results in the precipitation of the major portion of the fluoride present in the extract to produce a filtrate having approximately 15% phosphorus pentoxide, 0.04% fluorine, and a calcium oxide to phosphorus pentoxide ratio of approximately 0.9. To this filtrate is added approximately 12 parts by weight of comminuted limestone per 100 parts of defluorinated extract. The result of the reaction of these ingredients is the precipitation of a material which is predominantly dicalcium phosphate. The dicalcium phosphate solids are filtered off and show a recovery of approximately 99% of the phosphates present in the extract solution. The dicalcium phosphate is dried and the product contains approximately 20% phosphorus, and an elemental weight P/F in excess of 100.

The filter cake containing the precipitated fluorides was mixed with extract from green superphosphate from storage tank 38 in the proportions of approximately 11 pounds of cake per 100 pounds by weight of green extract solution. The resultant slurry is dried in a rotary kiln and screened to produce a —3+12 mesh product containing approximately 56% available phosphorus pentoxide, the drying being effected as in Example II.

*Example IV*

About 10 tons per hour of phosphate rock, ground to 50% passing through a 200 mesh screen and of about 67% bone phosphate of lime analysis, was mixed with about 6 tons per hour of about 96% sulfuric acid added as 50–60° Bé. aqueous solution. The mixture was thoroughly agitated for about one minute, after which it was discharged onto a continuous belt. The belt length and its speed were such that the mixture remained on the belt about twenty minutes. The discharge from the belt was stored in a pile for about fourteen days. The stored material was then removed from storage, broken up, and sufficient solution from the process (previously prepared leach solution plus added water) added to give a slurry of about 35% non-dissolved solids. Continuous multi-stage countercurrent decantation (for example, using a tray washer), produces a leach solution containing about 30% dissolved solids. This is the primary leach or phosphate solution. This solution is freed of non-dissolved solids by centrifuging, filtering, or by the use of cyclone separators, and has a P/F weight ratio of about 20.

It is then further processed by adding about 0.45 ton per hour of marble flour or other suitable limestone to the leach solution. The solution is continuously dried and granulated in a direct fired rotary kiln at a temperature not exceeding about 200° C. In the drying of the product there was provided within the rotary kiln a recirculating bed of previously dried material such that there was built up a pelletized product in the form of a series of layers of high analysis phosphate fertilizer extending from the center of said pellets outwardly. The bed of material which was recirculated through the drier was continuously screened and a desired portion of properly sized pellets separated therefrom. Undersized material was recirculated and oversized material was ground and recirculated as a part of such bed. The final pelletized product contained from about 30% to about 50% by weight of monocalcium phosphate, from about 5% to about 15% by weight of dicalcium phosphate, from about 0.5% to about 2% by weight of tricalcium phosphate, from about 2% to about 10% by weight of calcium metaphosphate, from about 5% to about 10% by weight of calcium pyrophosphate, and from about 3% to about 8% by weight of free phosphoric acid. The product was non-hygroscopic and contained from about 55% to about 56% by weight of available phosphorus pentoxide of which about 30% to about 35% by weight was water soluble.

In place of using about 0.45 ton of marble flour, about 0.25 ton of calcium oxide, or its equivalent in calcium hydroxide alternatively, may be used. This product also contains about 55–56% phosphorus pentoxide in available form. Also, in producing this product (i.e., the 55–56% available phosphorus pentoxide) substantially equivalent molar quantities of calcium oxide or calcium hydroxide, as compared with the molar quantities of marble flour, can be employed. Dolomitic limestone or other similar limestone may be employed in place of marble flour. In this instance, the final product will be found to contain a lower fluorine content than when ordinary limestone is used. Mixtures of quicklime or hydrated lime with limestone are also suitable for use.

*Example V*

An extract of green or unaged acidulated phosphate rock was prepared in the same manner as described in Example III, particularly with reference to the treatment of the second acid mix there referred to. The extract so obtained was characterized by an elemental phosphorus to elemental fluorine weight ratio of about 6. The extract so produced was treated by contact thereof with superheated steam in a manner generally similar to that described in Patent No. 2,165,000 to increase the elemental phosphorus to elemental fluorine mole ratio to a value of about 25. The extract was then reacted with calcium carbonate in an amount requisite only to substantially completely precipitate the fluorine-containing materials present therein. The fluorine precipitation reaction was carried out at a pH of about 2.5 for a time period of about 45 minutes and the precipitate so formed separated from the mother liquor. About 85% of the phosphate values originally present in the extract were retained in the mother liquor which was thereafter reacted in conventional manner with additional calcium carbonate to produce a feed grade dicalcium phosphate precipitate which was recovered and dried.

In lieu of steam, alkali metal ions, for example in the form of aqueous solutions of alkali metal salts, such as sodium and potassium chloride, sulfate, and the like, can be employed to raise the elemental phosphorus to elemental fluorine weight ratio of such extracts to a value of not less than 15.

The term "feed grade dicalcium phosphate" is employed herein as embracive of dicalcium phosphates having a fluorine content sufficiently low to be acceptable for use as animal feed supplements.

We claim:

1. A non-dusting, non-hygroscopic, high analysis phosphate fertilizer in the form of porous pellets comprising a plurality of generally concentric layers of phosphate fertilizer material extending from the center of said pellets outwardly, said layers being of progressively increasing diameter, each of said layers being dried on its surface so as to exhibit a non-hygroscopic behavior, there being present in said fertilizer product from about 5% to about 15% by weight of calcium pyrophosphate and from about 2% to about 10% by weight of calcium metaphosphate, said fertilizer product containing from about 45% to about 60% by weight of phosphorus pentoxide of which about 20% to about 40% by weight is water-soluble, the calcium pyrophosphate and calcium metaphosphate content of the said fertilizer product being concentrated at the hard, dried, non-hygroscopic surface of each of said layers.

2. A process for producing a multilayer high analysis, granular, non-hygroscopic phosphate fertilizer which comprises acidulating particulate phosphate rock with an amount of sulfuric acid requisite to convert the phosphate values in said rock substantially entirely to water-soluble form, slurrying the acidulated rock with water to provide a liquid phase in the form of an aqueous solution of said water-soluble phosphate values and a solid phase of predominantly calcium sulfate, separating said liquid phase solution from said solid phase calcium sulfate, adjusting the calcium oxide to phosphorus pentoxide mole ratio in said liquid phase solution to a value of not less than about 0.85 with a calcium base, thereafter spraying said liquid phase solution onto a load of particulate pellet nuclei and drying the coated nuclei so formed in a drier, thus producing dried coated nuclei having hard non-hygroscopic surfaces, recirculating these dried coated nuclei to the spraying zone and forming a second sprayed coating thereon, drying the thus coated nuclei, and continuing said recirculating and drying for a time period requisite to produce a pellet of the desired size in the form of a plurality of concentric layers of phosphatic fertilizer material extending from the center of said pellets outwardly, each of said concentric layers being characterized by a hard, non-dusting, non-hygroscopic surface.

3. The process of claim 2 wherein said bed of pellet nuclei takes the form of solid material obtained by the drying of said liquid phase solution, the calcium oxide to phosphorus pentoxide mole ratio of which has been adjusted to a value of not less than about 0.85.

4. The process of claim 3 wherein said liquid phase phosphate solution after adjustment of the calcium oxide to phosphorus pentoxide mole ratio thereof to a value of not less than about 0.85 is sprayed on said recirculating load in an amount such that the moisture content of the load subsequent to said spraying does not exceed about 15% by weight.

5. The process of claim 3 wherein said drier is operated at a temperature of from about 150° C. to about 230° C.

References Cited by the Examiner
UNITED STATES PATENTS

| | | | |
|---|---|---|---|
| Re. 19,750 | 11/35 | Billings et al. | 23—313 |
| 1,239,221 | 9/17 | Rodman | 23—313 |
| 1,761,400 | 6/30 | Liljenroth | 71—40 |
| 2,041,088 | 5/36 | Pfirrmann | 71—64 |
| 2,142,944 | 1/39 | Kerschbaum | 23—106 |
| 2,174,614 | 10/39 | Bornemann et al. | 23—106 |
| 2,244,158 | 6/41 | Hubbard et al. | 23—313 |
| 2,709,649 | 5/55 | Le Baron | 71—40 |
| 2,739,886 | 3/56 | Facer | 71—40 |
| 2,759,795 | 8/56 | Archer | 71—40 |

DONALL H. SYLVESTER, *Primary Examiner.*

MAURICE A. BRINDISI, GEORGE D. MITCHELL, A. LOUIS MONACELL, *Examiners.*